(12) United States Patent
Banerjee et al.

(10) Patent No.: US 10,881,582 B2
(45) Date of Patent: Jan. 5, 2021

(54) INDIVIDUAL DOSE PACK

(71) Applicant: GlaxoSmithKline Consumer Healthcare Holdings (US) LLC, Wilmington, DE (US)

(72) Inventors: Sriman Banerjee, Warren, NJ (US); Kathryn Cramer, Mazomanie, WI (US); Gautam Debnath, West Bengal (IN)

(73) Assignee: GlaxoSmithKline Consumer Healthcare Holdings (US) LLC, Wilmington, DE (US)

( * ) Notice: Subject to any disclaimer, the term of this patent is extended or adjusted under 35 U.S.C. 154(b) by 0 days.

(21) Appl. No.: 16/004,858

(22) Filed: Jun. 11, 2018

(65) Prior Publication Data

US 2019/0374433 A1    Dec. 12, 2019

(51) Int. Cl.
   *B65D 85/804* (2006.01)
   *A61J 1/14* (2006.01)
   *A47J 31/40* (2006.01)

(52) U.S. Cl.
   CPC ............ *A61J 1/1431* (2015.05); *A47J 31/407* (2013.01); *A61J 1/1443* (2013.01); *B65D 85/8046* (2013.01); *B65D 2215/00* (2013.01)

(58) Field of Classification Search
   CPC .... A61J 1/1431; A61J 1/10; A61J 1/12; A61J 1/00; B65D 85/8046; B65D 2215/00; A47J 31/407
   USPC ...................... 206/438, 528, 223, 484, 484.1
   See application file for complete search history.

(56) References Cited

U.S. PATENT DOCUMENTS

| | | |
|---|---|---|
| 4,859,337 A | 8/1989 | Woltermann |
| 5,840,189 A | 11/1998 | Sylvan et al. |
| 5,897,899 A | 4/1999 | Fond |
| 6,068,871 A | 5/2000 | Fond et al. |
| 6,645,537 B2 | 11/2003 | Sweeney et al. |
| 6,758,130 B2 | 7/2004 | Sarent et al. |
| 6,844,015 B2 | 1/2005 | Yuguchi |
| 7,757,466 B2 | 7/2010 | Conti |
| 8,361,527 B2 | 1/2013 | Winkler et al. |
| 8,474,368 B2 | 7/2013 | Kilber et al. |
| 8,501,254 B2 | 8/2013 | Wong et al. |
| 8,528,469 B2 | 9/2013 | Doglioni Majer |

(Continued)

FOREIGN PATENT DOCUMENTS

| | | |
|---|---|---|
| CN | 102574634 B | 8/2016 |
| EP | 512468 A1 | 11/1992 |

(Continued)

*Primary Examiner* — Rafael A Ortiz
(74) *Attorney, Agent, or Firm* — Roshni A. Sitapara

(57) ABSTRACT

Aspects of the present invention are directed to an individual dose pack. The individual dose pack may comprise a single serving pod and an overwrap surrounding the entirety of the single serving pod and sealing the single serving pod therein, wherein the overwrap is child-resistant and creates an impermeable barrier being resistant to the passage of liquids and gases. The single serving pod may include a cup, at least one pharmaceutical active ingredient provided in the cup, and a lid affixed to the cup. The overwrap is a multi-layer structure including a first layer being a biaxially-oriented polyethylene terephthalate layer, a second layer being a polyethylene layer, a third layer being an aluminum foil layer, and fourth layer being an ionomer layer.

24 Claims, 2 Drawing Sheets

(56) References Cited

U.S. PATENT DOCUMENTS

| | | | |
|---|---|---|---|
| 8,535,743 B2 | 9/2013 | Kamerbeek et al. | |
| 8,563,058 B2 | 10/2013 | Roulin et al. | |
| D695,111 S | 12/2013 | Hansen et al. | |
| 8,617,677 B2 * | 12/2013 | Trouilhet | B32B 7/12 428/35.7 |
| 8,808,777 B2 | 8/2014 | Kamerbeek et al. | |
| 8,846,120 B2 | 9/2014 | Wong et al. | |
| 8,850,960 B2 | 10/2014 | Biesheuvel et al. | |
| 8,895,090 B2 | 11/2014 | Mahlich | |
| 8,906,435 B2 | 12/2014 | Kamerbeek et al. | |
| 8,906,436 B2 | 12/2014 | Nowak | |
| 8,916,220 B2 | 12/2014 | Mahlich | |
| 9,085,410 B2 | 7/2015 | Beer | |
| 9,108,794 B2 | 8/2015 | Fu et al. | |
| 9,120,617 B2 | 9/2015 | Beer | |
| 9,161,652 B2 | 10/2015 | Kamerbeek et al. | |
| D743,252 S | 11/2015 | Hansen et al. | |
| 9,271,601 B2 | 3/2016 | Kamerbeek et al. | |
| 9,295,278 B2 | 3/2016 | Nowak | |
| 9,307,857 B2 | 4/2016 | Kamerbeek et al. | |
| 9,321,240 B2 | 4/2016 | Reilly et al. | |
| 9,359,128 B2 | 6/2016 | Mahlich | |
| 9,371,174 B2 | 6/2016 | Wong et al. | |
| 9,409,705 B2 | 8/2016 | Wong et al. | |
| 9,452,879 B2 | 9/2016 | Fu et al. | |
| 9,480,647 B2 | 11/2016 | Benson et al. | |
| 9,527,661 B2 | 12/2016 | Fu et al. | |
| 9,555,957 B2 | 1/2017 | Winkler et al. | |
| 9,592,953 B2 | 3/2017 | Gerbaulet et al. | |
| 9,604,776 B2 | 3/2017 | Kamerbeek et al. | |
| 9,611,089 B2 | 4/2017 | Kamerbeek et al. | |
| 9,622,616 B1 | 4/2017 | Douglas et al. | |
| 9,629,494 B2 | 4/2017 | Fu et al. | |
| 9,656,798 B2 | 5/2017 | Kamerbeek et al. | |
| 9,675,201 B2 | 6/2017 | Wong et al. | |
| 9,688,465 B2 | 6/2017 | Trombetta et al. | |
| 9,725,231 B2 | 8/2017 | Biesheuvel et al. | |
| 9,743,798 B2 | 8/2017 | Fu et al. | |
| 9,815,616 B2 | 11/2017 | Kamerbeek et al. | |
| 9,840,365 B2 | 12/2017 | Norton et al. | |
| 2002/0020659 A1 | 2/2002 | Sweeney et al. | |
| 2003/0005826 A1 | 1/2003 | Sargent et al. | |
| 2003/0077359 A1 | 4/2003 | Fond et al. | |
| 2004/0118295 A1 | 6/2004 | Angeles | |
| 2004/0182250 A1 | 9/2004 | Halliday et al. | |
| 2005/0115414 A1 | 6/2005 | Yuguchi | |
| 2009/0087294 A1 | 4/2009 | Conti | |
| 2010/0005973 A1 | 1/2010 | Doglioni Majer | |
| 2010/0196545 A1 | 8/2010 | Buffet et al. | |
| 2010/0288131 A1 | 11/2010 | Kilber et al. | |
| 2011/0033580 A1 | 2/2011 | Biesheuvel et al. | |
| 2011/0073607 A1 | 3/2011 | Fu et al. | |
| 2011/0200683 A1 * | 8/2011 | Piper | A61K 31/327 424/616 |
| 2011/0303095 A1 * | 12/2011 | Fu | A47J 31/08 99/317 |
| 2011/0305801 A1 | 12/2011 | Beer | |
| 2012/0015080 A1 | 1/2012 | Roulin et al. | |
| 2012/0058226 A1 | 3/2012 | Winkler et al. | |
| 2012/0070543 A1 | 3/2012 | Mahlich | |
| 2012/0070551 A1 | 3/2012 | Mahlich | |
| 2012/0121765 A1 | 5/2012 | Kamerbeek et al. | |
| 2012/0148709 A1 | 6/2012 | Kamerbeek et al. | |
| 2012/0225168 A1 | 9/2012 | Kamerbeek et al. | |
| 2012/0231123 A1 | 9/2012 | Kamerbeek et al. | |
| 2012/0231124 A1 | 9/2012 | Kamerbeek et al. | |
| 2012/0231133 A1 | 9/2012 | Kamerbeek et al. | |
| 2012/0237640 A1 | 9/2012 | Buffet | |
| 2012/0251669 A1 | 10/2012 | Kamerbeek et al. | |
| 2012/0251670 A1 | 10/2012 | Kamerbeek et al. | |
| 2012/0251672 A1 | 10/2012 | Kamerbeek et al. | |
| 2012/0251694 A1 | 10/2012 | Kamerbeek et al. | |
| 2012/0258210 A1 | 10/2012 | Wong et al. | |
| 2012/0258219 A1 | 10/2012 | Wong et al. | |
| 2012/0258221 A1 | 10/2012 | Wong et al. | |
| 2012/0263830 A1 | 10/2012 | Kamerbeek et al. | |
| 2012/0263833 A1 | 10/2012 | Wong et al. | |
| 2013/0025466 A1 | 1/2013 | Fu et al. | |
| 2013/0087051 A1 | 4/2013 | Frydman | |
| 2013/0095212 A1 | 4/2013 | Beer | |
| 2013/0122167 A1 | 5/2013 | Winkler et al. | |
| 2013/0209618 A1 | 8/2013 | Trombetta et al. | |
| 2013/0295240 A1 | 11/2013 | Wong et al. | |
| 2013/0323366 A1 | 12/2013 | Gerbaulet et al. | |
| 2013/0333575 A1 | 12/2013 | Kamerbeek et al. | |
| 2014/0004231 A1 | 1/2014 | Norton et al. | |
| 2014/0023754 A1 | 1/2014 | Abegglen et al. | |
| 2014/0026761 A1 | 1/2014 | Bartoli et al. | |
| 2014/0037916 A1 | 2/2014 | Reilly et al. | |
| 2014/0069280 A1 | 3/2014 | Frydman | |
| 2014/0141128 A1 | 5/2014 | Trombetta et al. | |
| 2014/0161936 A1 | 6/2014 | Trombetta et al. | |
| 2014/0174300 A1 | 6/2014 | Husband et al. | |
| 2014/0208691 A1 | 7/2014 | Ballering | |
| 2014/0272016 A1 | 9/2014 | Nowak | |
| 2014/0328981 A1 | 11/2014 | Kamerbeek et al. | |
| 2014/0342058 A1 | 11/2014 | Wahhas | |
| 2014/0342059 A1 | 11/2014 | Trombetta et al. | |
| 2014/0356484 A1 | 12/2014 | Capitani | |
| 2014/0370164 A1 | 12/2014 | Biesheuvel et al. | |
| 2015/0010680 A9 | 1/2015 | Mahlich | |
| 2015/0050394 A1 | 2/2015 | Wong et al. | |
| 2015/0064311 A1 | 3/2015 | Fu et al. | |
| 2015/0079241 A1 | 3/2015 | Mahlich | |
| 2015/0093484 A1 | 4/2015 | Kamerbeek et al. | |
| 2015/0099046 A1 | 4/2015 | Nowak | |
| 2015/0151903 A1 | 6/2015 | Bartoli et al. | |
| 2015/0166257 A1 | 6/2015 | Trombetta et al. | |
| 2015/0183576 A1 | 7/2015 | Vanni et al. | |
| 2015/0239652 A1 | 8/2015 | Trombetta et al. | |
| 2015/0246741 A1 | 9/2015 | Hansen et al. | |
| 2015/0250347 A1 | 9/2015 | Fu et al. | |
| 2015/0314955 A1 | 11/2015 | Savage | |
| 2015/0352044 A1 | 12/2015 | Benson et al. | |
| 2016/0001968 A1 | 1/2016 | Krüger et al. | |
| 2016/0068335 A1 | 3/2016 | Kamerbeek et al. | |
| 2016/0068336 A1 | 3/2016 | Biesheuvel et al. | |
| 2016/0107831 A1 | 4/2016 | Talon et al. | |
| 2016/0145037 A1 * | 5/2016 | Trombley | B65D 85/8046 206/438 |
| 2016/0207696 A9 | 7/2016 | Trombetta et al. | |
| 2016/0214788 A1 | 7/2016 | Kamerbeek et al. | |
| 2016/0264349 A1 | 9/2016 | Kamerbeek et al. | |
| 2016/0280453 A1 | 9/2016 | Accursi | |
| 2016/0355327 A1 | 12/2016 | Minganti | |
| 2016/0367067 A1 | 12/2016 | Wong et al. | |
| 2017/0008694 A1 | 1/2017 | Andreae et al. | |
| 2017/0020814 A1 | 1/2017 | Benson et al. | |
| 2017/0055757 A1 | 3/2017 | Fu et al. | |
| 2017/0081111 A1 | 3/2017 | Wicks | |
| 2017/0101258 A1 | 4/2017 | Wicks | |
| 2017/0183147 A1 | 6/2017 | Kamerbeek et al. | |
| 2017/0259989 A1 | 9/2017 | Trombetta et al. | |
| 2017/0280929 A1 | 10/2017 | Douglas et al. | |
| 2017/0369231 A1 | 12/2017 | Biesheuvel et al. | |
| 2018/0126138 A1 * | 5/2018 | White | B65D 50/04 |

FOREIGN PATENT DOCUMENTS

| | | |
|---|---|---|
| EP | 524464 A1 | 1/1993 |
| EP | 1247756 A1 | 10/2002 |
| EP | 1897819 A1 | 3/2008 |
| EP | 2076452 A2 | 7/2009 |
| EP | 2326223 A1 | 6/2011 |
| EP | 2058243 B1 | 9/2011 |
| EP | 2394539 A1 | 12/2011 |
| EP | 2516296 A1 | 10/2012 |
| EP | 2394932 B1 | 6/2013 |
| EP | 2801538 A1 | 11/2014 |
| EP | 3073981 A1 | 10/2016 |
| EP | 3023360 B1 | 1/2018 |
| EP | 3270746 A1 | 1/2018 |

\* cited by examiner

INDIVIDUAL DOSE PACK

TECHNOLOGY FIELD

Aspects of the present invention are directed to an individual dose pack including a single serving pod, containing at least one pharmaceutical active ingredient, sealed within a child-resistant overwrap which provides an impermeable barrier against environmental factors.

BACKGROUND

Single serving pods that operate with automatic brewing machines provide a hassle-free way to prepare a single serving of a beverage for consumption. This method is particularly useful for preparing beverages containing pharmaceutical active ingredients since the users of such products are typically searching for ease of use and convenience. Additionally, user-friendly, single serving pods encourage users to utilize products containing pharmaceutical active ingredients that are beneficial for their health and wellbeing by streamlining the preparation process. Brewing a single serving of a beverage also prevents waste by avoiding preparing more than needed for the user.

Single serving pods are currently available and typically designed to be used with coffee, tea, and the like. Such products are not suitable for use with pharmaceutical active ingredients due to the sensitive nature of such ingredients. In particular, standard single serving pods are not capable of protecting the sensitive pharmaceutical active ingredients from exposure to the environment. It is critical that such products be designed to maintain the quality of the ingredients by preventing exposure to water, oxygen, and other environmental factors. Therefore, sensitive pharmaceuticals must be packaged in barrier packaging to prevent degradation and to maintain efficacy and safety for the duration of their shelf life.

Additionally, it is vital that any products used to house pharmaceuticals be packaged in child-resistant packaging to prevent children from ingesting potentially dangerous substances. Current statistics show that almost a third of reported pediatric exposures to toxic substances were due to inadvertent drug ingestion, and that over seventy percent of resulting pediatric fatalities were due to unintended exposure to dangerous substances. Thus, child-resistant packaging has been an area of significant research over the past several decades.

In addition to being housed in child-resistant packaging, it is equally important that packaging for pharmaceutical active ingredients be usable for senior adults with manual dexterity issues. Consumers with arthritis and people with disabilities have a higher per capita rate of consumption of pharmaceuticals. Opening child-resistant packaging can cause painful strain on the carpometacarpal joints of users with arthritis and similar conditions. This may discourage senior adults from utilizing such products and gaining access to vital pharmaceuticals.

Based on the concerns noted above, a single serving pod containing at least one pharmaceutical active ingredient that is sealed within a child-resistant and senior adult accessible packaging, which also provides an impermeable barrier against environmental factors, is highly desirable.

SUMMARY

Aspects of the present invention are directed to an individual dose pack for use with an automatic brewing machine comprising: a single serving pod including, a cup having a bottom portion and a side wall portion extending from the bottom portion to a rim surrounding an opening, the space between the bottom portion and the side wall portion defining an interior space, at least one pharmaceutical active ingredient provided in the interior space of the cup, and a lid affixed to the rim of the cup thereby closing the opening and securing the at least one pharmaceutical active ingredient within the interior space of the cup; and an overwrap surrounding the entirety of the single serving pod and sealing the single serving pod therein, wherein the overwrap is child-resistant and creates an impermeable barrier being resistant to the passage of liquids and gases, and wherein the overwrap is a multi-layer structure including a first layer being a biaxially-oriented polyethylene terephthalate layer, a second layer being a polyethylene layer, a third layer being an aluminum foil layer, and a fourth layer being an ionomer layer.

The present invention further provides that the at least one pharmaceutical active ingredient is acetaminophen, phenylephrine, dextromethorphan, diphenhydramine, ibuprofen, pseudoephedrine, guaifenesin, acetylcysteine, chlorpheniramine, cetirizine, levocetirizine, doxylamine succinate, loratadine, doxylamine, or a combination thereof. In an embodiment of the present invention, the at least one pharmaceutical active ingredient is acetaminophen. In another embodiment of the present invention, the at least one pharmaceutical active ingredient is a combination of acetaminophen, phenylephrine, and dextromethorphan. In another embodiment of the present invention, the at least one pharmaceutical active ingredient is a combination of acetaminophen, phenylephrine, and diphenhydramine. In another embodiment of the present invention, the at least one pharmaceutical active ingredient is a combination of guaifenesin and dextromethorphan.

The present invention further provides that the single dose pack is more than 70% child-resistant as determined by a Child-Resistant Test. In a preferred embodiment of the present invention, the single dose pack is 100% child-resistant as determined by a Child-Resistant Test.

The present invention further provides that the overwrap has a thickness between about 70-100 microns. The present invention further provides that the first layer of the overwrap has a thickness between about 20-30 microns. The present invention further provides that the second layer of the overwrap has a thickness between about 10-20 microns. The present invention further provides that the third layer of the overwrap has a thickness between about 7-12 microns. The present invention further provides that the fourth layer of the overwrap has a thickness between 30-40 microns.

The present invention further provides that the overwrap has a moisture vapor transmission rate of less than 0.001 g $H_2O/100$ $in^2/24$ hours. The present invention further provides that the overwrap has an oxygen transmission rate of less than 0.001 cc/100 $in^2/24$ hours.

The present invention further provides that the overwrap has a length between about 130-140 mm and a width between about 80-90 mm when laid flat.

The present invention further provides that the fourth layer of one end of the overwrap is folded and adhered to the fourth layer of another end of the overwrap to create a sealed portion and seal the single serving pod within the overwrap.

DETAILED DESCRIPTION

Aspects of the present invention are directed to an individual dose pack, including a single serving pod, for use in an automated brewing machine to brew a single serving of a beverage containing at least one pharmaceutical active ingredient. The single serving pod serves as the primary packaging for the at least one pharmaceutical active ingredient. The single serving pod is further packaged and sealed within a secondary packaging being an overwrap which creates a child-resistant and senior adult accessible seal around the pod. Furthermore, the overwrap provides a barrier that is impermeable to the environment including, but not limited to, water and oxygen.

Figure 2:
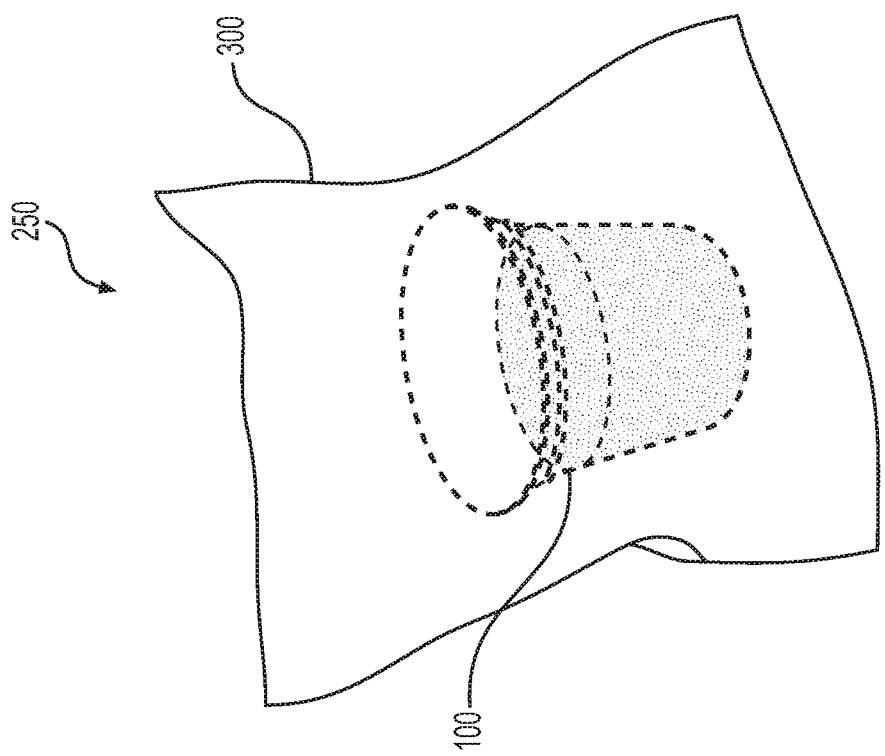
FIG. 2 illustrates a perspective view of an individual dose pack of the present invention.

The individual dose pack 250 in accordance with the present invention is generally depicted in FIG. 2. Specifically, FIG. 2 illustrates a perspective view of the single serving pod 100, containing at least one pharmaceutical active ingredient 200, packaged and sealed within the overwrap 300. During use, the single serving pod 100 may be removed from the overwrap 300 and placed in an automatic brewing machine to be prepared.

Figure 1:
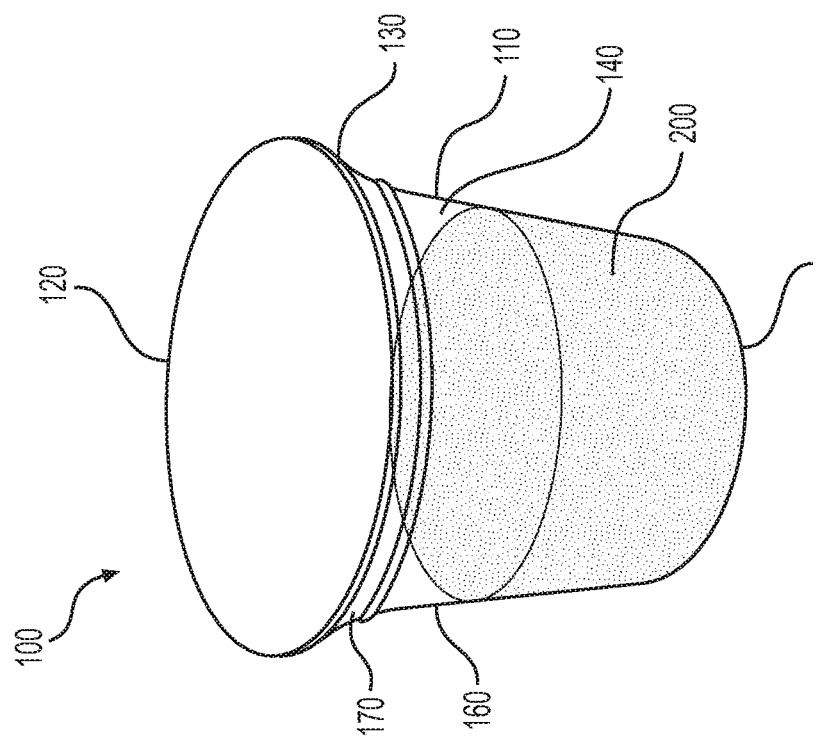
FIG. 1 illustrates a perspective view of a single serving pod of the present invention.

FIG. 1 illustrates a perspective view of the single serving pod 100 in accordance with the present invention. As shown in FIG. 1, the single serving pod 100 includes a cup 110 and a lid 120. The cup 110 has a bottom portion 150 and a side wall portion 160 extending upward from the bottom portion 150 towards a rim 130 surrounding an opening 170. The opening 170 leads to an interior space 140 defined by the side wall portion 160 and the bottom portion 150 of the cup 110. The lid 120 can be affixed onto the rim 130 of the cup 110 so as to create a permanent airtight seal. During the brewing cycle, the lid 120, bottom portion 150, and/or side wall portion 160 may be pierced or otherwise penetrated by the automatic brewing machine so that a liquid, such as water, may enter the cup 110 to be mixed with the pharmaceutical active ingredient 200 and the prepared beverage may be released from the cup 110.

Non-limiting examples of materials that may be incorporated into the laminate material of the cup 110, the lid 120, or the overwrap 300 include, polystyrene, ethylene vinyl alcohol, polyethylene, biaxially-oriented polyethylene terephthalate, polyethylene vinyl acetate, high-density polyethylene, cyclic olefin copolymers, biaxially oriented polyamide, ionomer, polychlorotrifluoroethylene, polypropylene, polyester, amorphous polyethylene terephthalate, polyvinyl chloride, polyethylene, aluminum foil, polyethylene terephthalate glycol, polyethylene terephthalate, orientated polyamide, low-density polyethylene, polyvinylidene chloride, or any combination thereof. Each layer of the laminate material of the cup 110, the lid 120, or the overwrap 300 may be attached to an adjacent layer via an adhesive.

In a preferred embodiment, the cup 110, including the bottom portion 150 and the side wall portion 160, may be a multi-layer structure made from any suitable materials that provide the desired barrier properties. Preferably, the cup 110 includes at least an outer polystyrene layer, a middle ethylene vinyl alcohol (EVOH) layer, and an inner polyethylene layer.

During brewing in a standard automatic brewing machine, the cup 110 may be exposed to an extremely hot liquid; thus, the cup 110 should maintain its shape and securely hold the pharmaceutical active ingredient 200 within the interior space 140 during the duration of the brewing process. Polystyrene may be used as the outer layer of the cup 110 due to its high stability under extreme temperatures. Furthermore, the automatic brewing machine may pierce the bottom portion 150 of the cup 110 to allow the prepared beverage to pass through the cup 110 into the user's container for consumption. Polystyrene is brittle i.e., it breaks when subject to stress without significant deformation, and allows the bottom portion 150 of the cup 110 to be easily and reliably pierced by any standard automatic brewing machine. The beverage prepared for consumption may be any volume. In certain embodiments, the prepared beverage may be 5 fluid ounces, 8 fluid ounces, or 10 fluid ounces. In a preferred embodiment, the prepared beverage is 8 fluid ounces.

The cup 110 may include a middle EVOH layer that protects the pharmaceutical active ingredient 200 from deterioration due to its low oxygen permeability. This increases the shelf life and the reliability of the pharmaceutical active ingredient 200 stored in the interior space 140 of the cup 110.

The pharmaceutical active ingredient 200 provided within the interior space 140 of the cup 110 may be any compound or composition that can be used to treat and/or prevent illness and/or provide overall health and wellness benefits to the user. Non-limiting examples of a pharmaceutical active ingredient include over the counter actives, behind the counter actives, prescription actives, vitamins, minerals, plant-derived materials, energy boosting materials, probiotics, fiber, prebiotics, decongestants, anti-inflammatories, cough suppressants, expectorants, antihistamines, antitussives, pain relievers, or any combination thereof.

The pharmaceutical active ingredient 200 may be acetaminophen, phenylephrine, dextromethorphan, diphenhydramine, ibuprofen, pseudoephedrine, guaifenesin, acetylcysteine, chlorpheniramine, cetirizine, levocetirizine, doxylamine succinate, loratadine, doxylamine, or any combination thereof. However, the present invention may be used with any pharmaceutical active ingredient, or any combination of pharmaceutical active ingredients, or a combination of pharmaceutical active ingredients with one or more excipients. The pharmaceutical active ingredient 200 may be in any suitable form including, but not limited to, a powder, a liquid, a gel, or a tablet.

In a preferred embodiment, the pharmaceutical active ingredient may be a combination of acetaminophen, phenylephrine, and dextromethorphan. In another preferred embodiment, the pharmaceutical active ingredient may be a combination of acetaminophen, phenylephrine, and diphenhydramine. In another preferred embodiment, the pharmaceutical active ingredient may be acetaminophen.

In certain embodiments, the one or more pharmaceutical active ingredients may be present in an amount from between about 1 mg and about 2,000 mg. In embodiments wherein the pharmaceutical active ingredient 200 includes acetaminophen, it is present in an amount between about 300 mg and about 1,000 mg. In a preferred embodiment, the acetaminophen is present in an amount of about 650 mg. In another preferred embodiment, the acetaminophen is present in an amount of about 500 mg. In embodiments wherein the pharmaceutical active ingredient 200 includes phenylephrine, it is present in an amount between about 5 mg and about 30 mg. In a preferred embodiment, the phenylephrine is present in an amount of about 10 mg. In embodiments wherein the pharmaceutical active ingredient 200 includes dextromethorphan, it is present in an amount between about 5 mg and about 30 mg. In a preferred embodiment, the dextromethorphan is present in an amount of about 20 mg. In embodiments wherein the pharmaceutical active ingredient includes diphenhydramine, it is present in an amount between about 5 mg and about 50 mg. In a preferred embodiment, the diphenhydramine is present in an amount of about 25 mg.

Non-limiting example of excipients include flavors, fillers, disintegrant, glidants, lubricants, antioxidants, sweeteners, colors, preservatives, lubricants, sorbents, or any combination thereof. Suitable flavors may include, for example, mint, menthol, peppermint, wintergreen, sweet mint, spearmint, vanillin, caramel, chocolate, coffee, cinnamon, clove, citrus, lemon, green tea, white tea, chamomile, lime, orange, grape, cherry, strawberry, fruit punch, honey, honey-lemon, other fruit flavors, or any combination thereof. Suitable fillers may include, for example, maltodextrin, silicon dioxide, sodium citrate, tribasic calcium phosphate, anhydrous citric acid, sodium citrate, various grades of microcrystalline cellulose, such as Avicel PH101, Avicel PH102, & Avicel PH200, corn starch, or any combination thereof. Suitable disintegrants may include, for example, sodium starch glycolate [Explotab], crosslinked polyvinylpyrrolidone, corn starch, acacia, croscarmellose sodium [Ac-di-sol], sodium carboxymethylcellulose, veegum, alginates, or any combination thereof. Suitable glidants may include, for example, talc, corn starch, stearic acid, calcium stearate, polyethylene glycol, silicon dioxide, sodium stearyl fumarate, magnesium stearate, vegetable and mineral oils, or any combination thereof. Suitable lubricants may include, for example, magnesium stearate, stearic acid and its pharmaceutically acceptable alkali metal salts, calcium stearate, sodium stearate, Cab-O-Sil, Syloid, sodium lauryl sulfate, sodium chloride, magnesium lauryl sulfate, talc, or any combination thereof. Suitable antioxidants may include, for example, alpha tocopherol, beta tocopherol, gamma tocopherol, delta tocopherol, butylated hydroxytoluene (BHT), butylated hydroxyanisole (BHA), ascorbic acid, fumaric acid, malic acid, ascorbyl palmitate, propyl gallate, sodium ascorbate, sodium metabisulfite, or any combination thereof. Suitable sweeteners may include, for example, acesulfame potassium, aspartame, sucrose, or any combination thereof. Suitable colors may include, for example, FD&C blue no. 1, FD&C red no. 40, D&C yellow no. 10, FD&C blue no. 1, FD&C red no. 40.

In a preferred embodiment, the lid 120 may be a multi-layer structure made from any suitable materials that provide the desired barrier properties. Preferably, the lid 120 includes at least an outer primer layer, a middle aluminum foil layer, and an inner sealant layer. The lid 120 can be securely and permanently sealed onto to the rim 130 of the cup 110 via the inner sealant layer of the lid 120 with the pharmaceutical active ingredient 200 in the interior space 140 of the cup 110. The inner sealant layer can create an airtight seal between the lid 120 and the cup 110 that further protects the pharmaceutical active ingredient 200.

The overall thickness of the lid 120 is between about 65 microns and about 82 microns. Preferably, the overall thickness of the lid 120 is about 73.8 microns. The outer primer layer has a thickness between about 4 microns and about 9 microns. Preferably, the outer primer layer has a thickness of about 6.8 microns. The middle aluminum foil layer has a thickness between about 34 microns and about 40 microns. Preferably, the middle aluminum foil layer has a thickness of about 37 microns. The inner sealant layer has a thickness between about 27 microns and about 33 microns. Preferably, the inner sealant layer has a thickness of about 30 microns. The total thickness of the lid 120 after embossing is between about 100 microns and about 150 microns. Preferably, the total thickness of the lid 120 after embossing is about 125 microns. Overall, the multi-layer structure of the lid 120 has a water vapor transmission rate of less than 0.05 g/100 in$^2$/24 hours.

While the cup 110 and the lid 120, as described above, provide barrier properties, they may not be sufficient on their own to protect the sensitive pharmaceutical active ingredient 200 of the present invention. Thus, the single serving pod 100 may be further packaged and sealed within a multi-layer overwrap 300 to provide additional protection from water, oxygen, and other environmental factors. The overwrap 300 can surround the entirety of the single serving pod 100, thereby sealing the single serving pod 100 within the overwrap 300.

Specifically, the overwrap 300 achieves a level of moisture protection and child resistance that is required for pharmaceutical products. This is a higher standard than manufacturers of single serving pods used for tea, coffee, or other such beverages would require. The overwrap 300 may have a length between about 135 mm and about 140 mm and a width between about 80 mm and about 90 mm when laid flat on a surface without the single serving pod 100 sealed within. Preferably, the length of the overwrap 300 is about 135 mm and the width of the overwrap 300 is about 86.5 mm when laid flat on a surface without the single serving pod 100 sealed within. Furthermore, the overwrap 300 may have a total thickness between about 70 microns and about 100 microns. Preferably, the thickness of the overwrap 300 is about 79.2 microns.

Figure 4:
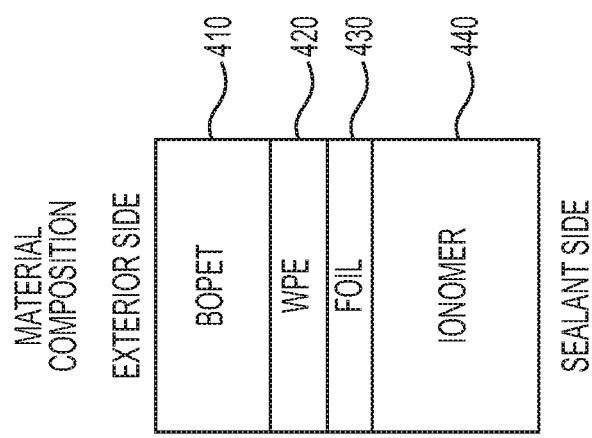
FIG. 4 illustrates a cross sectional view of the layers of the overwrap of the present invention.

FIG. 4 illustrates a cross sectional view of the layers of the overwrap 300 of the present invention. The overwrap 300 can be made from any suitable materials that provide the desired barrier properties. In a preferred embodiment, the overwrap 300 includes a first layer being a biaxially-oriented polyethylene terephthalate (BoPET) layer 410. The first layer 410 is a polyester film made from polyethylene terephthalate stretched in two different directions to improve mechanical orientation. The first layer 410 provides several beneficial characteristics for the present invention, including, but not limited to, high tensile strength, durability, barrier properties, and clarity.

Furthermore, the first layer 410 of the overwrap 300 has a thickness between about 20 microns and about 30 microns. Preferably, the first layer 410 has a thickness of about 23 microns. The thickness of the first layer 410 adds to the strength of the overwrap 300 and allows it to be child-resistant. Typically, the thickness of a BoPET layer used for similar products would be much less; however, such similar products would not be child-resistant and thus, cannot be used with pharmaceutical ingredients.

In a preferred embodiment, the overwrap 300 includes a second layer being a polyethylene (PE) layer 420 having a thickness between about 10 microns and about 20 microns. Preferably, the thickness of the second layer 420 is about 13 microns. Specifically, the second layer 420 may be a white PE layer. The second layer 420 can provide a white background for printing and bonds the first layer 410 with the third layer 430.

In a preferred embodiment, the overwrap 300 includes a third layer being an aluminium foil layer 430. The third layer 430 has a thickness between about 7 microns and about 12 microns. Preferably, the thickness of the third layer 430 is about 8.9 microns. The third layer 430 allows the overwrap 300 to be resistant to the passage of liquids and gases, including water and oxygen, among others. Specifically, the molecular structure of aluminum foil creates a strong barrier that is ideal for use with pharmaceutical ingredients due to their sensitivity to environmental factors.

The third layer 430 eliminates exposure to liquids and gases; thereby, extending the shelf life of the present invention and maintaining quality and efficacy of the pharmaceutical active ingredient 200 held within the cup 110. Furthermore, the third layer 430 is durable and strong while being light-weight and malleable; therefore, it is ideal for packaging products of various shapes and sizes without any lose to its barrier properties.

In a preferred embodiment, the overwrap includes a fourth layer being an ionomer layer 440. The fourth layer 440 has a thickness between about 30 microns and about 40 microns. Preferably, the thickness of the fourth layer 440 is about 34.3 microns. The fourth layer 440 is a sealant and may be folded over itself to create a seal around the single serving pod 100.

As can be seen in FIG. 4, the first layer 410 may be the outermost layer of the overwrap 300 on an exterior side. The second layer 420 may be provided between the first layer 410 and the third layer 430. The third layer 430 may be provided between the second layer 420 and the fourth layer 440. The fourth layer 440 may be the inner most layer of the overwrap 300 on a sealant or interior side.

Figure 3:
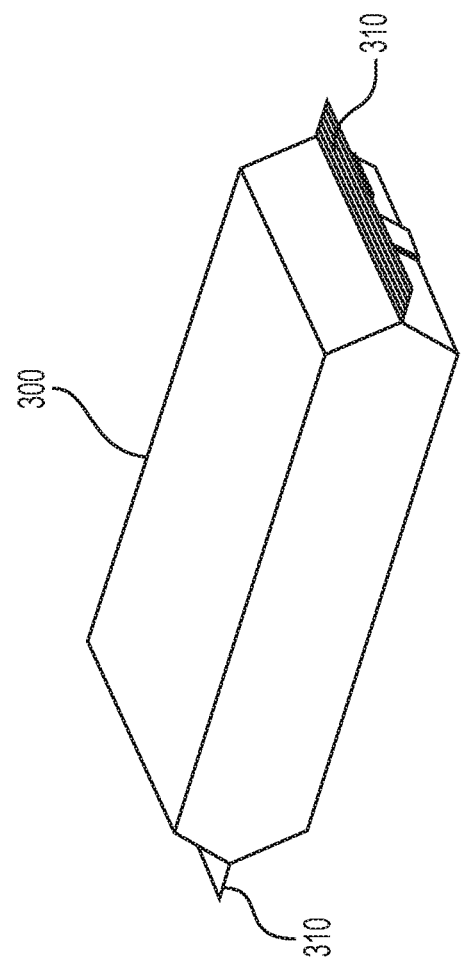
FIG. 3 illustrates a perspective view of an overwrap of the present invention.

FIG. 3 illustrates a perspective view of the single serving pod 100 sealed within the overwrap 300. As see in FIG. 3, the fourth layer 440 of one end of the overwrap 300 may be sealed to the fourth layer 440 of another end of the overwrap 300 to create a sealed portion 310. The sealed portion 310 provides a perfect seal to further protect the pharmaceutical active ingredient 200 held in the single serving pod 100.

The overwrap 300 has a moisture vapor transmission rate of less than 0.005 g $H_2O$/100 $in^2$/24 hours. Preferably, the overwrap 300 has a moisture vapor transmission rate of less than 0.001 g $H_2O$/100 $in^2$/24 hours. The moisture vapor transmission rate of the overwrap was tested at a temperature of 100° F. and a relative humidity of 90%. Furthermore, the overwrap 300 has an oxygen transmission rate of less than 0.005 cc/100 $in^2$/24 hours. Preferably, the overwrap 300 has an oxygen transmission rate of less than 0.001 cc/100 $in^2$/24 hours. The oxygen transmission rate was tested at a temperature of 73° F. and a relative humidity of 0%. Thus, the overwrap 300 has excellent oxygen and moisture barrier properties ideal for the pharmaceutical active ingredient 200 that may be used in the individual dose pack 250.

Furthermore, the overwrap 300 provides a child-resistant and tear-resistant packaging for the single serving pod 100. Tear-resistant refers to a material that is capable of experiencing a reasonable level of stress and/or deformation without experiencing a significant loss of integrity when undergoing forces that can be applied by an individual. It is critical that the overwrap 300 be child-resistant so as to prevent children from ingesting potentially dangerous substances, such as the pharmaceutical active ingredient 200 that may be held within the cup 110 of the present invention.

A standardized Child-Resistant Test in accordance with 16. C.F.R. § 1700 Poison Prevention Packaging was performed on the present invention. A test failure is defined as any child who opens a package or gains access to the contents of the package. In an embodiment, the present invention can be child-resistant and can be given a rating that is referred to as the F value. The F value is the number of unit doses to which access is considered a test failure. The F value is determined based on the number of unit doses that may cause serious personal injury or serious illness to a child based on a 25 pound (11.4 kg) child. In an embodiment of the present invention, the individual dose pack 250 may be a F=1 package. In another embodiment, the individual dose pack 250 of the present invention may be a F=3 package. In another embodiment, the individual dose pack 250 of the present invention may be a F=4 package. In another embodiment, the individual dose pack 250 of the present invention may be a F=5 package. In a preferred embodiment of the present invention, the individual dose pack is a F=2 package.

The Child-Resistant Test concluded that the individual dose pack 250 is more than 70% child-resistant when the package is a F=1, F=2, F=3, F=4, or F=5 package. In another embodiment, the individual dose pack is more than 80% child-resistant when the package is a F=1, F=2, F=3, F=4, or F=5 package. In a preferred embodiment, the individual dose pack is 100% child resistant when the package is a F=1, F=2, F=3, F=4, or F=5 package.

Additionally, a Senior Adult Test in accordance with 16. C.F.R. § 1700 Poison Prevention Packaging was performed on the overwrap 300 of the present invention to ensure that adults with dexterity problems were able to access the single serving pod 100. In an embodiment, more than 90% of senior adults tested were successful in opening the overwrap 300 using scissors or other reasonable means. In a preferred embodiment, 100% of senior adults tested were successful in opening the overwrap 300 with scissors or other reasonable means.

Additional aspects of the present invention may be directed to methods of treating the symptoms of cold and/or flu, allergies, or other illnesses comprising preparing a beverage, as described herewith, and administering or consuming the prepared beverage. Additional aspects of the present invention may be directed to the use of a beverage prepared as described herein for the treatment of symptoms of cold and/or flu, allergies, or other illnesses.

Example 1

Example 1 describes the stability and appropriate shelf life of the present invention. Specifically, a stability study was conducted on an embodiment of the present invention wherein the pharmaceutical active ingredient 200 is a combination of 650 mg of acetaminophen, 10 mg of phenylephrine, and 20 mg of dextromethorphan.

The present invention was tested under long term storage conditions at a temperature of 25° C. and a relative humidity of 60%, under intermediate storage conditions at a temperature of 30° C. and a relative humidity of 65%, and under accelerated storage conditions at a temperature of 40° C. and a relative humidity of 75%.

As shown in Tables 1-3 below, the study generally concluded that the data for evaluation complied with the specifications for all time points and storage conditions. In particular, data generated for the appearance on granules and solution complied with specifications for all time points and storage conditions. Data generated for assay for each active complied with the specifications for all time points and storage conditions with minimal change over time. Data generated on the p-aminophenol showed no increase in degradation for all time points and storage conditions with maximum results less than 0.05%. Data generated on PHL021, PHL033, PHL052+PHL021-2, unspecified max degradants and sum of total degradants were well within the specification limits at each scheduled time point and storage condition. Data generated on DEX921, DEC922-1, unspecified degradants, and max and sum of total degradants were well within the specification limits at each scheduled time point and storage condition. The microbiological purity of the present invention has been assessed for total aerobic microbial count, total combined yeasts and mold count and the absence of the specific microorganisms *E. coli*. The microbiological purity has been shown to meet the requirements of the finished product specification for all samples tested.

Based on the results noted above, the stability study concluded that there is a high level of confidence that the present invention is sufficiently robust and that the single serving pod 100 can provide long term stability for the pharmaceutical active ingredient 200 in the interior space 140 of the cup 110.

The long term and accelerated stability data demonstrated that the present invention is not adversely impacted when packaged in the single serving pod 100. Therefore, the shelf life of the present invention is 24 months when packaged in the single serving pod 100 of the present invention and stored at a temperature below 25° C. or equivalent.

A temperature cycling study was performed to investigate the stability of the present invention when stored at freezing conditions and then allowed to thaw. For freeze thaw exposure, the present invention was exposed for 12 hours at −20° C. and then 12 hours at 10° C. for a total of 5 cycles and 10 cycles. In addition, a high temperature static study was conducted at 50° C. for two weeks. The results of the study concluded that the present invention is not temperature sensitive to freeze thaw conditions and high temperatures.

TABLE 1

Stability Data—Storage Condition: 25° C. and 60% Relative Humidity
Stability Study—Data Table 1

Storage Condition: 25 C./60% RH  
Product Name: Powder for oral solution containing Acetaminophen 650 mg, Dextromethorphan hydrobromide 20 mg, Phenylephrine hydrochloride 10 mg (Project Brewer)  
Purpose of Study: To generate stability data on two batches of Theraflu Daytime (DT) formulation in sealed cups placed in overwrap to support market introduction  
Pack Information: Printpack PS/PE Cup (CP203) with Tadbik A1/PE Coex Lid (130339A) and Bernis CR & Barrier Overwrap (X209-3290-E) formed into pouches by Bosch.  
Study Number: Lincoln LIMS: 3877 (P2697) Batch No.: 172310445 Formula No: 16702A  
Manufacturer: GSK, Lincoln Date of Manufacture: 26 Jul. 2017 Batch Size: 2661 kg  
Site of Packaging: GSK, Lincoln Packaging Date: 20 Sep. 2017 Target Expiration Date: 24 months  
Date Study Started: 16 Oct. 2017 Storage Orientation: N/A  
Drug Substance: Acetaminphen, Phenylephrine Hydrochloride, and Dextromethorphan Hydrobromide Drug Substance Lot No.: TBD  
Drug Substance Batch Size: TBD  
Drug Substance Manufacturer: Mallinckrodt, Divi's, Malladi

| | | | | Time (Inspection Periods in Months) | | | | | | | | |
|---|---|---|---|---|---|---|---|---|---|---|---|---|
| Attributes | Method | Stability Limits | Initial | 01 MO | 03 MO | 06 MO | 09 MO | 12 MO | 18 MO | 24 MO | 30 MO | 36 MO |
| Packaging Component/ Container Evaluation | TI-402774 | Primary package does not exhibit any imperfections and/or abnormalities associated with aging, such as cracking, peeling, delamination, holes, or incomplete seal areas. | Acceptable | NS | Acceptable | NT | NT | NT | NT | NT | NT | NT |
| Appearance (Powder) | TI-402774 | Free flowing granular powder free from extraneous matter and devoid of lumps | Pass | NS | Pass | NT | NT | NT | NT | NT | NT | NT |
| Color (Powder) | TI-402774 | Pink, White to off-white, beige and brown | Pass | NS | Pass | NT | NT | NT | NT | NT | NT | NT |
| Appearance (Solution) | TI-402774 | Hazy | Pass | NS | Pass | NT | NT | NT | NT | NT | NT | NT |
| Color (Solution) | TI-402774 | Pink-red | Pass | NS | Pass | NT | NT | NT | NT | NT | NT | NT |
| Odor (Solution) | TI-402774 | Berry-menthol aroma | Pass | NS | Pass | NT | NT | NT | NT | NT | NT | NT |
| Acetaminophen (APAP) | TI-402774 | 90.0%-110.0% | 99.3% | NS | 100.6% | NT | NT | NT | NT | NT | NT | NT |
| Phenylephrine HCl (PHL) | TI-402774 | 90.0%-110.0% | 99.1% | NS | 100.7% | NT | NT | NT | NT | NT | NT | NT |
| Dextromethorphan HBr (DEX) | TI-402774 | 90.0%-110.0% | 100.0% | NS | 100.4% | NT | NT | NT | NT | NT | NT | NT |
| p-aminophenol | TI-402774 | NMT 0.20% | <0.05 | NS | <0.05 | NT | NT | NT | NT | NT | NT | NT |
| Phenylephine HCl Deg | TI-402774 | | | | | | | | | | | |
| PHL021 | | NMT 0.9% | <0.10 | NS | <0.10 | NT | NT | NT | NT | NT | NT | NT |
| PHL033 | | NMT 1.1% | <0.20 | NS | <0.20 | NT | NT | NT | NT | NT | NT | NT |
| PHL052 + PHL021-2 | | NMT 0.8% | <0.10 | NS | <0.10 | NT | NT | NT | NT | NT | NT | NT |
| Unspecified deg. Max | | NMT 0.2% | <0.10 | NS | <0.10 | NT | NT | NT | NT | NT | NT | NT |
| Sum of Total Degs | | NMT 3.0% | <0.10 | NS | <0.10 | NT | NT | NT | NT | NT | NT | NT |
| Dextromethorphan | TI-402774 | | | | | | | | | | | |

TABLE 1-continued

Stability Data—Storage Condition: 25° C. and 60% Relative Humidity
Stability Study—Data Table 1

| | | | | | | | | | | | |
|---|---|---|---|---|---|---|---|---|---|---|---|
| HBr Deg | | | | | | | | | | | |
| DEX921 | | NMT 1.5% | <0.10 | NS | <0.10 | NT | NT | NT | NT | NT | NT |
| DEX922-1 | | NMT 1.1% | <0.10 | NS | <0.10 | NT | NT | NT | NT | NT | NT |
| Unspecified deg. Max | | NMT 0.2% | <0.10 | NS | <0.10 | NT | NT | NT | NT | NT | NT |
| Sum of DEX Degs | | NMT 3.3% | <0.10 | NS | <0.10 | NT | NT | NT | NT | NT | NT |
| Microbiological Purity | | | | | | | | | | | |
| TAMC | TI-402774 | ≤$10^3$ cfu/g | 100 | NS | NS | NS | NS | NT | NT | NT | NT |
| TYMC | TI-402774 | ≤$10^2$ cfu/g | <20 | NS | NS | NS | NS | NT | NT | NT | NT |
| *Escherichia coli* | TI-402774 | absent/g | Pass | NS | NS | NS | NS | NT | NT | NT | NT |

Note:
Failed = Test out of Spec(s)sS
NT = Not Tested,
ND = Not Detected,
NS = Not Scheduled.
NR = No Result
N/A = Not Applicable

TABLE 2

Stability Data—Storage Condition: 30° C. and 65% Relative Humidity
Stability Study—Data Table 2

Storage Condition: 30 C./65% RH    Product Name: Powder for oral solution containing Acetaminophen 650 mg, Dextromethorphan hydrobromide 20 mg, Phenylephrine hydrochloride 10 mg
Purpose of Study: Primary: To generate stability data on two batches of Theraflu Daytime (DT) formulation in sealed cups placed in overwrap to support market introduction
Pack Information: Printpack PS/PE Cup (CP203) with Tadbik A1/PE Coex Lid (130339A) and Bernis CR & barrier Overwrap (X209-3290-E) formed into pouches by Bosch.
Study Number: Lincoln LIMS: 3877 (P2697)    Batch No.: 172310445    Formula No: 16702A
Manufacturer: GSK, Lincoln    Date of Manufacture: 26 Jul. 2017    Batch Size: 2661 kg
Site of Packaging: GSK, Lincoln    Packaging Date: 20 Sep. 2017    Target Expiration Date: 24 months
Date Study Started: 16 Oct. 2017    Storage Orientation: N/A
Drug Substance: Acetaminphen, Phenylephrine Hydrochloride, and    Drug Substance Lot No.: TBD
Dextromethorphan Hydrobromide    Drug Substance Batch Size: TBD
Drug Substance Manufacturer: Mallinckrodt, Divi's, Malladi

| | | | | Time (Inspection Periods in Months) | | | | | | | | |
|---|---|---|---|---|---|---|---|---|---|---|---|---|
| Attributes | Method | Stability Limits | Initial | 01 MO | 03 MO | 06 MO | 09 MO | 12 MO | 18 MO | 24 MO | 30 MO | 36 MO |
| Packaging Component/ Container Evaluation | TI-402774 | Primary package does not exhibit any imperfections and/or abnormalities associated with aging, such as cracking, peeling, delamination, holes, or incomplete seal areas. | Acceptable | NS | Acceptable | NT | NT | NT | NS | NS | NS | NS |
| Appearance (Powder) | TI-402774 | Free flowing granular powder free from extraneous matter and devoid of lumps | Pass | NS | Pass | NT | NT | NT | NS | NS | NS | NS |
| Color (Powder) | TI-402774 | Pink, White to off-white, beige and brown | Pass | NS | Pass | NT | NT | NT | NS | NS | NS | NS |
| Appearance (Solution) | TI-402774 | Hazy | Pass | NS | Pass | NT | NT | NT | NS | NS | NS | NS |
| Color (Solution) | TI-402774 | Pink-red | Pass | NS | Pass | NT | NT | NT | NS | NS | NS | NS |
| Odor (Solution) | TI-402774 | Berry-menthol aroma | Pass | NS | Pass | NT | NT | NT | NS | NS | NS | NS |
| Acetaminophen (APAP) | TI-402774 | 90.0%-110.0% | 99.3% | NS | 100.1% | NT | NT | NT | NS | NS | NS | NS |
| Phenylephrine HCl (PHL) | TI-402774 | 90.0%-110.0% | 99.1% | NS | 101.8% | NT | NT | NT | NS | NS | NS | NS |
| Dextromethorphan HBr (DEX) | TI-402774 | 90.0%-110.0% | 100.0% | NS | 100.7% | NT | NT | NT | NS | NS | NS | NS |
| p-aminophenol | TI-402774 | NMT 0.20% | <0.05 | NS | <0.05 | NT | NT | NT | NS | NS | NS | NS |
| Phenylephine HCl Deg | TI-402774 | | | | | | | | | | | |

TABLE 2-continued

Stability Data—Storage Condition: 30° C. and 65% Relative Humidity
Stability Study—Data Table 2

| | | | | | | | | | | | | |
|---|---|---|---|---|---|---|---|---|---|---|---|---|
| PHL021 | | NMT 0.9% | <0.10 | NS | <0.10 | NT | NT | NT | NS | NS | NS | NS |
| PHL033 | | NMT 1.1% | <0.20 | NS | <0.20 | NT | NT | NT | NS | NS | NS | NS |
| PHL052 + PHL021-2 | | NMT 0.8% | <0.10 | NS | <0.10 | NT | NT | NT | NS | NS | NS | NS |
| Unspecified deg. Max | | NMT 0.2% | <0.10 | NS | <0.10 | NT | NT | NT | NS | NS | NS | NS |
| Sum of Total Degs | | NMT 3.0% | <0.10 | NS | <0.10 | NT | NT | NT | NS | NS | NS | NS |
| Dexrtomethorphan HBr Deg | TI-402774 | | | | | | | | | | | |
| DEX921 | | NMT 1.5% | <0.10 | NS | <0.10 | NT | NT | NT | NS | NS | NS | NS |
| DEX922-1 | | NMT 1.1% | <0.10 | NS | <0.10 | NT | NT | NT | NS | NS | NS | NS |
| Unspecified deg. Max | | NMT 0.2% | <0.10 | NS | <0.10 | NT | NT | NT | NS | NS | NS | NS |
| Sum of DEX Degs | | NMT 3.3% | <0.10 | NS | <0.10 | NT | NT | NT | NS | NS | NS | NS |
| Microbiological Purity | | | | | | | | | | | | |
| TAMC | TI-402774 | ≤$10^3$ cfu/g | 100 | NS | NS | NS | NS | NS | NS | NS | NS | NS |
| TYMC | TI-402774 | ≤$10^2$ cfu/g | <20 | NS | NS | NS | NS | NS | NS | NS | NS | NS |
| *Escherichia coli* | TI-402774 | absent/g | Pass | NS | NS | NS | NS | NS | NS | NS | NS | NS |

Note:
Failed = Test out of Spec(s)sS
NT = Not Tested,
ND = Not Detected,
NS = Not Scheduled.
NR = No Result
N/A = Not Applicable

TABLE 3

Stability Data—Storage Condition: 40° C. and 75% Relative Humidity
Stability Study—Data Table 3

Storage Condition: 40 C./75% RH  Product Name: Powder for oral solution containing Acetaminophen 650 mg, Dextromethorphan hydrobromide 20 mg, Phenylephrine hydrochloride 10 mg
Purpose of Study: Primary: To generate stability data on two batches of Theraflu Daytime (DT) formulation in sealed cups placed in overwrap to support market introduction
Pack Information: Printpack PS/PE Cup (CP203) with Tadbik Al/PE Coex Lid (130339A) and Bernis CR & Barrier Overwrap (X209-3290-E) formed into pouches by Bosch.
Study Number: Lincoln LIMS: 3877 (P2697)  Batch No.: 172310445  Formula No: 16702A
Manufacturer: GSK, Lincoln  Date of Manufacture: 26 Jul. 2017  Batch Size: 2661 kg
Site of Packaging: GSK, Lincoln  Packaging Date: 20 Sep. 2017  Target Expiration Date: 24 months
Date Study Started: 16 Oct. 2017  Storage Orientation: N/A
Drug Substance: Acetaminphen, Phenylephrine Hydrochloride, and Dextromethorphan Hydrobromide  Drug Substance Lot No.: TBD  Drug Substance Batch Size: TBD
Drug Substance Manufacturer: Mallinckrodt, Divi's, Malladi

| | | | Time (Inspection Periods in Months) | | | | | | | | | |
|---|---|---|---|---|---|---|---|---|---|---|---|---|
| Attributes | Method | Stability Limits | Initial | 01 MO | 03 MO | 06 MO | 09 MO | 12 MO | 18 MO | 24 MO | 30 MO | 36 MO |
| Packaging Component/ Container Evaluation | TI-402774 | Primary package does not exhibit any imperfections and/or abnormalities associated with aging, such as cracking, peeling, delamination, holes, or incomplete seal areas. | Acceptable | Acceptable | Acceptable | NT | NS | NS | NS | NS | NS | NS |
| Appearance (Powder) | TI-402774 | Free flowing granular powder free from extraneous matter and devoid of lumps | Pass | Pass | Pass | NT | NS | NS | NS | NS | NS | NS |
| Color (Powder) | TI-402774 | Pink, White to off-white, beige and brown | Pass | Pass | Pass | NT | NS | NS | NS | NS | NS | NS |
| Appearance (Solution) | TI-402774 | Hazy | Pass | Pass | Pass | NT | NS | NS | NS | NS | NS | NS |
| Color (Solution) | TI-402774 | Pink-red | Pass | Pass | Pass | NT | NS | NS | NS | NS | NS | NS |
| Odor (Solution) | TI-402774 | Berry-menthol aroma | Pass | Pass | Pass | NT | NS | NS | NS | NS | NS | NS |

TABLE 3-continued

Stability Data—Storage Condition: 40° C. and 75% Relative Humidity
Stability Study—Data Table 3

| | | | | | | | | | | | | |
|---|---|---|---|---|---|---|---|---|---|---|---|---|
| Acetaminophen (APAP) | TI-402774 | 90.0%-110.0% | 99.3% | 100.1% | 100.7% | NT | NS | NS | NS | NS | NS | NS |
| Phenylephrine HCl (PHL) | TI-402774 | 90.0%-110.0% | 99.1% | 101.2% | 101.4% | NT | NS | NS | NS | NS | NS | NS |
| Dextromethorphan HBr (DEX) | TI-402774 | 90.0%-110.0% | 100.0% | 100.0% | 100.5% | NT | NS | NS | NS | NS | NS | NS |
| p-aminophenol | TI-402774 | NMT 0.20% | <0.05 | <0.05 | <0.05 | NT | NS | NS | NS | NS | NS | NS |
| Phenylephine HCl Deg | TI-402774 | | | | | | | | | | | |
| PHL021 | | NMT 0.9% | <0.10 | <0.10 | <0.10 | NT | NS | NS | NS | NS | NS | NS |
| PHL033 | | NMT 1.1% | <0.20 | <0.20 | <0.20 | NT | NS | NS | NS | NS | NS | NS |
| PHL052 + PHL021-2 | | NMT 0.8% | <0.10 | <0.10 | 0.1 | NT | NS | NS | NS | NS | NS | NS |
| Unspecified deg. Max | | NMT 0.2% | <0.10 | <0.10 | <0.10 | NT | NS | NS | NS | NS | NS | NS |
| Sum of Total Degs | | NMT 3.0% | <0.10 | <0.10 | 0.1 | NT | NS | NS | NS | NS | NS | NS |
| Dexrtomethorphan HBr Deg | TI-402774 | | | | | | | | | | | |
| DEX921 | | NMT 1.5% | <0.10 | <0.10 | <0.10 | NT | NS | NS | NS | NS | NS | NS |
| DEX922-1 | | NMT 1.1% | <0.10 | <0.10 | <0.10 | NT | NS | NS | NS | NS | NS | NS |
| Unspecified deg. Max | | NMT 0.2% | <0.10 | <0.10 | <0.10 | NT | NS | NS | NS | NS | NS | NS |
| Sum of DEX Degs | | NMT 3.3% | <0.10 | <0.10 | <0.10 | NT | NS | NS | NS | NS | NS | NS |
| Microbiological Purity | | | | | | | | | | | | |
| TAMC | TI-402774 | ≤$10^3$ cfu/g | 100 | NS | NS | NS | NS | NS | NS | NS | NS | NS |
| TYMC | TI-402774 | ≤$10^2$ cfu/g | <20 | NS | NS | NS | NS | NS | NS | NS | NS | NS |
| *Escherichia coli* | TI-402774 | absent/g | Pass | NS | NS | NS | NS | NS | NS | NS | NS | NS |

Note:
Failed = Test out of Spec(s)sS
NT = Not Tested,
ND = Not Detected,
NS = Not Scheduled.
NR = No Result
N/A = Not Applicable

Example 2

Example 2 describes the stability and appropriate shelf life of the present invention. Specifically, a stability study was conducted on an embodiment of the present invention wherein the pharmaceutical active ingredient 200 is a combination of 650 mg of acetaminophen, 10 mg of phenylephrine, and 25 mg of diphenhydramine.

The present invention was tested under long term storage conditions at a temperature of 25° C. and a relative humidity 60%, under intermediate storage conditions at a temperature of 30° C. and a relative humidity of 65%, and under accelerated storage conditions at a temperature of 40° C. and a percent relative humidity of 75%.

As can be seen in Tables 4-6 below, the study generally concluded that the data for evaluation complied with the specifications for all time points and storage conditions. In particular data generated for the appearance on granules and solution complied with specifications for all time points and storage conditions. Data generated for assay for each active complied with the specifications for all time points and storage conditions with minimal change over time. Data generated on the p-aminophenol showed no increase in degradation for all time points and storage conditions with maximum results less than 0.05%. Data generated on PHL021, PHL033, PHL052+PHL021-2, unspecified degradants, and max and sum of total degradants were well within the specification limits at each scheduled time point and storage condition. Data generated on DPH degradants BEH, BPH, unspecified degradants, and max and sum of total degradants were well within the specification limits at each scheduled time point and storage condition. The microbiological purity of the present invention has been assessed for total aerobic microbial count, total combined yeasts and mold count and the absence of the specific microorganisms *E. coli*. The microbiological purity has been shown to meet the requirements of the finished product specification for all samples tested.

Based on the results noted above, the stability study concluded that there is a high level of confidence that the present invention is sufficiently robust and that the single serving pod 100 can provide long term stability for the pharmaceutical active ingredient 200 in the interior space 140 of the cup 110.

The long term, intermediate, and accelerated stability data demonstrated that the present invention is not adversely impacted when packaged in the single serving pod 100. Therefore, the shelf life of the present invention is 24 months when packaged in the single serving pod 100 of the present invention and stored at a temperature below 25° C. or equivalent.

A temperature cycling study was performed to investigate the stability of the present invention when stored at freezing conditions and then allowed to thaw. For freeze thaw exposure, the present invention was exposed for 12 hours at −20° C. and then 12 hours at 10° C. for a total of 5 cycles and 10 cycles. In addition, a high temperature static study was conducted at 50° C. for two weeks. The results of the study concluded that the present invention is not temperature sensitive to freeze thaw conditions and high temperatures.

TABLE 4

Stability Data—Storage Condition: 25° C. and 60% Relative Humidity
Stability Study—Data Table 1

Storage Condition: 25° C./60% RH   Product Name: Powder for oral solution containing Acetaminophen 650 mg, Dextromethorphan hydrobromide 20 mg, Phenylephrine hydrochloride 10 mg TABLE 4-continued Stability Data—Storage Condition: 25° C. and 60% Relative Humidity
Stability Study—Data Table 1

(Project Brewer)
Purpose of Study: Generate stability data on two batches of Theraflu Nighttime (NT) formulation in sealed cups placed in overwrap.
Pack Information: Printpack PS/PE Cup (CP203) with Tadbik A1/PE Coex Lid (130339A) and Bernis CR & Barrier Overwrap (X209-3290-E) formed into pouches by Bosch.
Study Number: Lincoln LIMS: 3880 (P2698)  Batch No.: 172310585  Formula No: 16082A
Manufacturer: GSK, Lincoln  Date of Manufacture: 20 Jun. 2017  Batch Size: 2560 kg
Site of Packaging: GSK, Lincoln  Packaging Date: 22 Sep. 2017  Target Expiration: 24 months
Date Study Started: 16 Oct. 2017  Storage Orientation: N/A
Drug Substance: Acetaminphen, Phenylephrine Hydrochloride, and  Drug Substance Lot No.: TBD
Diphenhydramine Hydrochloride  Drug Substance Batch Size: TBD
Drug Substance Manufacturer: Mallinckrodt, Malladi, Kongo Chemical

| Attributes | Method | Stability Limits | Initial | 01 MO | 03 MO | 06 MO | 09 MO | 12 MO | 18 MO | 24 MO | 30 MO | 36 MO |
|---|---|---|---|---|---|---|---|---|---|---|---|---|
| Packaging Component/ Container Evaluation | TI-403189 | Primary package does not exhibit any imperfections and/or abnormalities associated with aging, such as cracking, peeling, delamination, holes, or incomplete seal areas. | Acceptable | NS | Acceptable | NT | NT | NT | NT | NT | NS | NS |
| Appearance (Granules) | TI-403189 | Course, free flowing granular powder may contain soft humps | Pass | NS | Pass | NT | NT | NT | NT | NT | NS | NS |
| Color (Granules) | TI-403189 | White to off-white, yellow, beige and brown | Pass | NS | Pass | NT | NT | NT | NT | NT | NS | NS |
| Appearance (Solution) | TI-403189 | Hazy solution | Pass | NS | Pass | NT | NT | NT | NT | NT | NS | NS |
| Color (Solution) | TI-403189 | Yellow | Pass | NS | Pass | NT | NT | NT | NT | NT | NS | NS |
| Odor (Solution) | TI-403189 | Lemon-honey aroma | Pass | NS | Pass | NT | NT | NT | NT | NT | NS | NS |
| Acetaminophen | TI-403189 | 90.0%-110.0% | 98.7% | NS | 98.5% | NT | NT | NT | NT | NT | NS | NS |
| Phenylephrine HCl | TI-403189 | 90.0%-110.0% | 99.9% | NS | 99.5% | NT | NT | NT | NT | NT | NS | NS |
| Diphenhydramine HCl | TI-403189 | 90.0%-110.0% | 100.1% | NS | 99.9% | NT | NT | NT | NT | NT | NS | NS |
| p-aminophenol | TI-403189 | NMT 0.15% | <0.05 | NS | <0.05 | NT | NT | NT | NT | NT | NS | NS |
| Phenylephine HCl Deg | TI-403189 | | | | | | | | | | | |
| PHL021 | | NMT 0.9% | <0.10 | NS | <0.10 | NT | NT | NT | NT | NT | NS | NS |
| PHL033 | | NMT 0.7% | <0.20 | NS | <0.20 | NT | NT | NT | NT | NT | NS | NS |
| PHL052 + PHL021 | | NMT 0.5% | <0.10 | NS | <0.10 | NT | NT | NT | NT | NT | NS | NS |
| Unspecified deg. Max | | NMT 0.2% | <0.10 | NS | <0.10 | NT | NT | NT | NT | NT | NS | NS |
| Total PHL Degs | | NMT 2.3% | <0.10 | NS | <0.10 | NT | NT | NT | NT | NT | NS | NS |
| Diphenhydramine HCl Deg. | TI-403189 | | | | | | | | | | | |
| Sum of benzhydrol and benzophenone | | NMT 0.7% | <0.10 | NS | <0.10 | NT | NT | NT | NT | NT | NS | NS |
| Unspecified deg. Max | | NMT 0.2% | <0.10 | NS | <0.10 | NT | NT | NT | NT | NT | NS | NS |
| Total DPH Degs | | NMT 1.4% | <0.10 | NS | <0.10 | NT | NT | NT | NT | NT | NS | NS |
| Microbiological | TI-403189 | | | | | | | | | | | |
| TAMC | | ≤$10^3$ cfu/g | <100 | NS | NS | NS | NS | NT | NS | NT | NS | NS |
| TYMC | | ≤$10^2$ cfu/g | <20 | NS | NS | NS | NS | NT | NS | NT | NS | NS |
| *Escherichia coli* | | Absent in 1 g | Pass | NS | NS | NS | NS | NT | NS | NT | NS | NS |

Note:
Failed = Test out of Spec(s)sS
NT = Not Tested,
ND = Not Detected,
NS = Not Scheduled.
NR = No Result
N/A = Not Applicable

TABLE 5

Stability Data—Storage Condition: 30° C. and 65% Relative Humidity
Stability Study—Data Table 2

Storage Condition: 30° C./65% RH  
Product Name: Powder for oral solution containing Acetaminophen 650 mg, Dextromethorphan hydrobromide 20 mg, Phenylephrine hydrochloride 10 mg (Project Brewer)  
Purpose of Study: To generate stability data on two batches of Theraflu Nighttime (NT) formulation in sealed cups placed in overwrap.  
Pack Information: Printpack PS/PE Cup (CP203) with Tadbik A1/PE Coex Lid (130339A) and Bernis CR & barrier Overwrap (X209-3290-E) formed into pouches by Bosch.  
Study Number: Lincoln LIMS: 3880 (P2698)    Batch No.: 172310585    Formula No: 16082A  
Manufacturer: GSK, Lincoln    Date of Manufacture: 20 Jun. 2017    Batch Size: 2560 kg  
Site of Packaging: GSK, Lincoln    Packaging Date: 22 Sep. 2017    Target Expiration: 24 months  
Date Study Started: 16 Oct. 2017    Storage Orientation: N/A  
Drug Substance: Acetaminphen, Phenylephrine Hydrochloride, and Diphenhydramine Hydrochloride    Drug Substance Lot No.: TBD    Drug Substance Batch Size: TBD  
Drug Substance Manufacturer: Mallinckrodt, Malladi, Kongo Chemical

| Attributes | Method | Stability Limits | Initial | 01 MO | 03 MO | 06 MO | 09 MO | 12 MO | 18 MO | 24 MO | 30 MO | 36 MO |
|---|---|---|---|---|---|---|---|---|---|---|---|---|
| Packaging Component/ Container Evaluation | TI-403189 | Primary package does not exhibit any imperfections and/or abnormalities associated with aging, such as cracking, peeling, delamination, holes, or incomplete seal areas. | Acceptable | NS | Acceptable | NT | NT | NT | NS | NS | NS | NS |
| Appearance (Granules) | TI-403189 | Course, free flowing granular powder may contain soft humps | Pass | NS | Pass | NT | NT | NT | NS | NS | NS | NS |
| Color (Granules) | TI-403189 | White to off-white, yellow, beige and brown | Pass | NS | Pass | NT | NT | NT | NS | NS | NS | NS |
| Appearance (Solution) | TI-403189 | Hazy solution | Pass | NS | Pass | NT | NT | NT | NS | NS | NS | NS |
| Color (Solution) | TI-403189 | Yellow | Pass | NS | Pass | NT | NT | NT | NS | NS | NS | NS |
| Odor (Solution) | TI-403189 | Lemon-honey aroma | Pass | NS | Pass | NT | NT | NT | NS | NS | NS | NS |
| Acetaminophen | TI-403189 | 90.0%-110.0% | 98.7% | NS | 98.4% | NT | NT | NT | NS | NS | NS | NS |
| Phenylephrine HCl | TI-403189 | 90.0%-110.0% | 99.9% | NS | 99.2% | NT | NT | NT | NS | NS | NS | NS |
| Diphenhydramine HCl | TI-403189 | 90.0%-110.0% | 100.1% | NS | 99.6% | NT | NT | NT | NS | NS | NS | NS |
| p-aminophenol | TI-403189 | NMT 0.15% | <0.05 | NS | <0.05 | NT | NT | NT | NS | NS | NS | NS |
| Phenylephine HCl Deg | TI-403189 | | | | | | | | | | | |
| PHL021 | | NMT 0.9% | <0.10 | NS | <0.10 | NT | NT | NT | NS | NS | NS | NS |
| PHL033 | | NMT 0.7% | <0.20 | NS | <0.20 | NT | NT | NT | NS | NS | NS | NS |
| PHL052 + PHL021-2 | | NMT 0.5% | <0.10 | NS | <0.10 | NT | NT | NT | NS | NS | NS | NS |
| Unspecified deg. Max | | NMT 0.2% | <0.10 | NS | <0.10 | NT | NT | NT | NS | NS | NS | NS |
| Sum of Total Degs | | NMT 2.3% | <0.10 | NS | <0.10 | NT | NT | NT | NS | NS | NS | NS |
| Diphenhydramine HCl Deg. | TI-403189 | | | | | | | | | | | |
| Sum of benzhydrol and benzophenone | | NMT 0.7% | <0.10 | NS | <0.10 | NT | NT | NT | NS | NS | NS | NS |
| Unspecified deg. Max | | NMT 0.2% | <0.10 | NS | <0.10 | NT | NT | NT | NS | NS | NS | NS |
| Total DPH Degs | | NMT 1.4% | <0.10 | NS | <0.10 | NT | NT | NT | NS | NS | NS | NS |
| Microbiological | TI-403189 | | | | | | | | | | | |
| TAMC | | ≤$10^3$ cfu/g | <100 | NS | NS | NS | NS | NS | NS | NS | NS | NS |
| TYMC | | ≤$10^2$ cfu/g | <20 | NS | NS | NS | NS | NS | NS | NS | NS | NS |
| *Escherichia coli* | | Absent in 1 g | Pass | NS | NS | NS | NS | NS | NS | NS | NS | NS |

Note:  
Failed = Test out of Spec(s)sS  
NT = Not Tested,  
ND = Not Detected,  
NS = Not Scheduled.  
NR = No Result  
N/A = Not Applicable

TABLE 6

Stability Data—Storage Condition: 40° C. and 75% Relative Humidity
Stability Study—Data Table 3

Storage Condition: 40° C./75% RH
Product Name: Powder for oral solution containing Acetaminophen 650 mg, Dextromethorphan hydrobromide 20 mg, Phenylephrine hydrochloride 10 mg (Project Brewer)
Purpose of Study: To generate stability data on two batches of Theraflu Nighttime (NT) formulation in sealed cups placed in overwrap.
Pack Information: Printpack PS/PE Cup (CP203) with Tadbik Al/PE Coex Lid (130339A) and Bernis CR & Barrier Overwrap (X209-3290-E) formed into pouches by Bosch.
Study Number: Lincoln LIMS: 3880 (P2698)  Batch No.: 172310585  Formula No: 16082A
Manufacturer: GSK, Lincoln  Date of Manufacture: 20 Jun. 2017  Batch Size: 2560 kg
Site of Packaging: GSK, Lincoln  Packaging Date: 22 Sep. 2017  Target Expiration: 24 months
Date Study Started: 16 Oct. 2017  Storage Orientation: N/A
Drug Substance: Acetaminphen, Phenylephrine Hydrochloride, and Diphenhydramine Hydrochloride  Drug Substance Lot No.: TBD
Drug Substance Batch Size: TBD
Drug Substance Manufacturer: Mallinckrodt, Malladi, Kongo Chemical

| Attributes | Method | Stability Limits | Initial | 01 MO | 03 MO | 06 MO | 09 MO | 12 MO | 18 MO | 24 MO | 30 MO | 36 MO |
|---|---|---|---|---|---|---|---|---|---|---|---|---|
| Packaging Component/Container Evaluation | TI-403189 | Primary package does not exhibit any imperfections and/or abnormalities associated with aging, such as cracking, peeling, delamination, holes, or incomplete seal areas. | Acceptable | Acceptable | Acceptable | NT | NS | NS | NS | NS | NS | NS |
| Appearance (Granules) | TI-403189 | Course, free flowing granular powder may contain soft humps | Pass | Pass | Pass | NT | NS | NS | NS | NS | NS | NS |
| Color (Granules) | TI-403189 | White to off-white, yellow, beige and brown | Pass | Pass | Pass | NT | NS | NS | NS | NS | NS | NS |
| Appearance (Solution) | TI-403189 | Hazy solution | Pass | Pass | Pass | NT | NS | NS | NS | NS | NS | NS |
| Color (Solution) | TI-403189 | Yellow | Pass | Pass | Pass | NT | NS | NS | NS | NS | NS | NS |
| Odor (Solution) | TI-403189 | Lemon-honey aroma | Pass | Pass | Pass | NT | NS | NS | NS | NS | NS | NS |
| Acetaminophen (APAP) | TI-403189 | 90.0%-110.0% | 98.7% | 97.6% | 98.5% | NT | NS | NS | NS | NS | NS | NS |
| Phenylephrine HCl (PHL) | TI-403189 | 90.0%-110.0% | 99.9% | 98.6% | 98.7% | NT | NS | NS | NS | NS | NS | NS |
| Diphenhydramine HCl (DPH) | TI-403189 | 90.0%-110.0% | 100.1% | 97.6% | 98.9% | NT | NS | NS | NS | NS | NS | NS |
| p-aminophenol | TI-403189 | NMT 0.15% | <0.05% | <0.05% | <0.05% | NT | NS | NS | NS | NS | NS | NS |
| Phenylephine HCl Deg | TI-403189 | | | | | | | | | | | |
| PHL021 | | NMT 0.9% | <0.10 | <0.10 | 0.20 | NT | NS | NS | NS | NS | NS | NS |
| PHL033 | | NMT 0.7% | <0.20 | <0.20 | <0.20 | NT | NS | NS | NS | NS | NS | NS |
| PHL052 + PHL021-2 | | NMT 0.5% | <0.10 | <0.10 | <0.10 | NT | NS | NS | NS | NS | NS | NS |
| Unspecified deg. Max | | NMT 0.2% | <0.10 | <0.10 | <0.10 | NT | NS | NS | NS | NS | NS | NS |
| Sum of Total Degs | | NMT 2.3% | <0.10 | 0.0 | 0.20 | NT | NS | NS | NS | NS | NS | NS |
| Diphenhydramine HCl Deg. | TI-403189 | | | | | | | | | | | |
| Sum of benzhydrol and benzophenone | | NMT 0.7% | <0.10 | <0.10 | 0.1 | NT | NS | NS | NS | NS | NS | NS |
| Unspecified deg. Max | | NMT 0.2% | <0.10 | <0.10 | <0.10 | NT | NS | NS | NS | NS | NS | NS |
| Total DPH Degs | | NMT 1.4% | <0.10 | <0.10 | 0.1 | NT | NS | NS | NS | NS | NS | NS |
| Microbiological | TI-403189 | | | | | | | | | | | |
| TAMC | | ≤$10^3$ cfu/g | <100 | NS | NS | NS | NS | NS | NS | NS | NS | NS |
| TYMC | | ≤$10^2$ cfu/g | <20 | NS | NS | NS | NS | NS | NS | NS | NS | NS |
| *Escherichia coli* | | Absent in 1 g | Pass | NS | NS | NS | NS | NS | NS | NS | NS | NS |

Note:
Failed = Test out of Spec(s)sS
NT = Not Tested,
ND = Not Detected,
NS = Not Scheduled.
NR = No Result
N/A = Not Applicable Example 3

Example 3 details the testing method and test result for the Child-Resistant Test conducted on the present invention to ensure its compliance with The Poison Prevention Packaging Act of 1970 Regulations and The Code of Federal Regulations Title 16: Part 1700.20. The testing method and results of the test are detailed below.
Child-Resistant Testing Method:

25 male and 25 female children aged 42 months up to and including 51 months were tested in pairs in two separate testing situations. 30% of the children were aged 42-44 months, 40% of the children were aged 45-48 months, and 30% of the children were aged 49-51 months. All of the children were suitably prepared in advance and provided with detailed information.

First, a pair of children were placed in a room, handed identical packages, and prompted by the administrator to "please try to open this for me". Each child was then given 5 minutes to try to open his/her package. The administrator closely observed the children at all times during the test and did not influence the children in any way, either verbally or non-verbally. The children were allowed freedom of movement to work on their packages, i.e., the children were allowed to stand up, get down on the floor, bang, or pry the package. The children were also allowed to talk to each other about opening the package and could watch each other try to open the packages. If a child opened the package, the administrator said, "thank you" and took the package from the child and placed in out of the child's reach. The child was not asked to open the package a second time.

At the end of 5 minutes, the administrator demonstrated how to open the package if either child had not opened his/her package. A separate demo packaged was used by the administrator for the demonstration. Before the demonstration, the children were asked to set their packages aside and were not allowed to continue to try to open their packages. During the demonstration, the administrator held the package approximately two feet from the children and opened the packaged at a normal speed as if the administrator was going to use the contents. The administrator did not exaggerate any motions. The administrator also did not discuss or describe how to open the package.

After the demonstration, the administrator began a second 5 minute test period by instructing the children by a prompt of "now you try to open your packages". If one or both children had not used their teeth to open their packages during the first 5 minute test period, the administrator instructed the children before beginning the second 5 minute test period that "you can use your teeth if you want to". The administrator then observed the children during the second 5 minute test period or until both children opened their packages, whichever came first.
Child-Resistant Testing Results:

Zero openings were registered in the first 5 minute test period (before demonstration). Furthermore, zero openings were registered in the second 5 minute test period (after demonstration). This corresponds to a total percentage of 0.00% for the full 10 minute test, which is within the tolerance range of US 16 CFR § 1700.20. Thus, the present invention complies with the Child-Resistant Test requirements of US 16 CFR § 1700.20, as shown in Table 7.

These results are based on the assumption that an opening of the package is defined as the situation when a child gets access to 1 (or more) units packed in the package. This corresponds to a failure rate of F=1. Table 7 below lists the number of openings of the package that would constitute a pass, require continued testing, or constitute a fail for the first 5 minute testing period and the full 10 minute test according to US 16 CFR § 1700.20.

TABLE 7

Number of Openings—Acceptance (Pass), Continue Testing, and Rejection (Fail) Criteria

| Test panel | Cumulative number of children | Package openings | | | | | |
|---|---|---|---|---|---|---|---|
| | | First 5 minutes | | | Full 10 minutes | | |
| | | Pass | Continue | Fail | Pass | Continue | Fail |
| 1 | 50 | 0-3 | 4-10 | 11+ | 0-5 | 6-14 | 15+ |
| 2 | 100 | 4-10 | 11-18 | 19+ | 6-15 | 16-24 | 25+ |
| 3 | 150 | 11-18 | 19-25 | 26+ | 16-25 | 26-34 | 35+ |
| 4 | 200 | 19-30 | | 31+ | 26-40 | | 41+ |

Example 4

Example 4 details the testing method and test result for the Senior Adult Test conducted on the present invention to ensure its compliance with The Poison Prevention Packaging Act of 1970 Regulations and The Code of Federal Regulations Title 16: Part 1700.20. The testing method and results of the test are detailed below.
Senior Adult Testing Method:

The test was conducted with 100 participants of which 70% of the were female and 30% were male. 25% of the participants were aged 50-54, 25% of the participants were aged 55-59, and 50% of the participants were aged 60-70. Each participant participated in the test individually and was not in the presence of other participants or onlookers. The test was conducted in a well-lit and distraction free space.

The administrator began the first 5 minute test period by instructing the participant to open the package provided according to the instructions on the package. The participant was allowed up to 5 minutes to read the instructions and open the package. After 5 minutes, or when the participant has opened the package, whichever came first, the administrator took all test materials from the participant.

Next, the administrator began the second test period by giving the participant another identical package. The second test period lasted for 1 minute. The administrator instructed the participant that this is an identical package and to open it according to the instructions again. Also, the administrator informed the participants that to open the package, they were to cut along the end seals with scissors. After the second test period, or when the participant has opened the package, whichever came first, the administrator took away all test materials from the participant.
Senior Adult Testing Results:

16 CFR § 1700.20 allows a rate of 10% of unsuccessful openings. The results of the Senior Adult Test performed according to the procedure described indicates that zero unsuccessful attempts to open the package were recorded during the first test period. Zero unsuccessful attempts to open the package were recorded during the second test period. This corresponds to a total percentage of 0.00% for the full 10-minute test, which is within the tolerance range of US 16 CFR § 1700.20. Thus, the present invention complies with the adult test requirements of 16 CFR § 1700.20.

What is claimed is:
1. An individual dose pack for use with an automatic brewing machine comprising:

a single serving pod including:
a cup having a bottom portion and a side wall portion extending from the bottom portion to a rim surrounding an opening, the space between the bottom portion and the side wall portion defining an interior space,
at least one pharmaceutical active ingredient provided in the interior space of the cup, and
a lid affixed to the rim of the cup thereby closing the opening and securing the at least one pharmaceutical active ingredient within the interior space of the cup; and
an overwrap surrounding the entirety of the single serving pod and sealing the single serving pod therein, wherein the overwrap creates an impermeable barrier being resistant to the passage of liquids and gases,
wherein the overwrap is a multi-layer structure including a first layer being a biaxially-oriented polyethylene terephthalate layer, a second layer being a polyethylene layer, a third layer being an aluminium foil layer, and a fourth layer being an ionomer layer,
wherein the overwrap is 100% child-resistant with zero openings registered as determined by a Child-Resistant Test, and
wherein the Child-Resistant Test was performed in accordance with The Poison Prevention Packaging Act of 1970 Regulations and The Code of Federal Regulations Title 16: Part 1700.20.

2. The individual dose pack according to claim 1, wherein the at least one pharmaceutical active ingredient is acetaminophen, phenylephrine, dextromethorphan, diphenhydramine, ibuprofen, pseudoephedrine, guaifenesin, acetylcysteine, chlorpheniramine, cetirizine, levocetirizine, doxylamine succinate, loratadine, doxylamine, or a combination thereof.

3. The individual dose pack according to claim 2, wherein the at least one pharmaceutical active ingredient is acetaminophen.

4. The individual dose pack according to claim 2, wherein the at least one pharmaceutical active ingredient is a combination of acetaminophen, phenylephrine, and dextromethorphan.

5. The individual dose pack according to claim 2, wherein the at least one pharmaceutical active ingredient is a combination of acetaminophen, phenylephrine, and diphenhydramine.

6. The individual dose pack according to claim 2, wherein the at least one pharmaceutical active ingredient is a combination of guaifenesin and dextromethorphan.

7. The individual does pack according to claim 1, wherein the overwrap has a thickness between about 70-100 microns.

8. The individual does pack according to claim 1, wherein the first layer of the overwrap has a thickness between about 20-30 microns.

9. The individual does pack according to claim 1, wherein the second layer of the overwrap has a thickness between about 10-20 microns.

10. The individual dose pack according to claim 1, wherein the third layer of the overwrap has a thickness between about 7-12 microns.

11. The individual does pack according to claim 1, wherein the fourth layer of the overwrap has a thickness between about 30-40 microns.

12. The individual does pack according to claim 1, wherein the overwrap has a moisture vapor transmission rate of less than 0.001 g $H_2O$/100 $in^2$/24 hours.

13. The individual dose pack according to claim 1, wherein the overwrap has an oxygen transmission rate of less than 0.001 cc/100 $in^2$/24 hours.

14. The individual dose pack according to claim 1, wherein the overwrap has a length between about 130-140 mm and a width between about 80-90 mm when laid flat.

15. The individual dose pack according to claim 1, wherein the fourth layer of one end of the overwrap is folded and adhered to the fourth layer of another end of the overwrap to create a sealed portion and seal the single serving pod within the overwrap.

16. A multi-layer overwrap comprising:
a first layer being a biaxially-oriented polyethylene terephthalate layer;
a second layer being a polyethylene layer;
a third layer being an aluminium foil layer;
and a fourth layer being an ionomer layer,
wherein the overwrap creates an impermeable barrier being resistant to the passage of liquids and gases,
wherein the overwrap is 100% child-resistant with zero openings registered as determined by a Child-Resistant Test, and
wherein the Child-Resistant Test was performed in accordance with The Poison Prevention Packaging Act of 1970 Regulations and The Code of Federal Regulations Title 16: Part 1700.20.

17. The multi-layer overwrap according to claim 16, wherein the multi-layer overwrap is 100% senior adult accessible with zero unsuccessful attempts to open registered as determined by a Senior Adult Test, and wherein the Senior Adult Test was performed in accordance with The Poison Prevention Packaging Act of 1970 Regulations and The Code of Federal Regulations Title 16: Part 1700.20.

18. The multi-layer overwrap according to claim 16, wherein the first layer of the multi-layer overwrap has a thickness between about 20-30 microns.

19. The multi-layer overwrap according to claim 16, wherein the second layer of the multi-layer overwrap has a thickness between about 10-20 microns.

20. The multi-layer overwrap according to claim 16, wherein the third layer of the multi-layer overwrap has a thickness between about 7-12 microns.

21. The multi-layer overwrap according to claim 16, wherein the fourth layer of the multi-layer overwrap has a thickness between about 30-40 microns.

22. The multi-layer overwrap according to claim 16, wherein the multi-layer overwrap has a moisture vapor transmission rate of less than 0.001 g $H_2O$/100 $in^2$/24 hours.

23. The multi-layer overwrap according to claim 16, wherein the multi-layer overwrap has an oxygen transmission rate of less than 0.001 cc/100 $in^2$/24 hours.

24. The individual dose pack according to claim 1, wherein the individual dose pack is 100% senior adult accessible with zero unsuccessful attempts to open registered as determined by a Senior Adult Test, and wherein the Senior Adult Test was performed in accordance with The Poison Prevention Packaging Act of 1970 Regulations and The Code of Federal Regulations Title 16: Part 1700.20.

* * * * *

UNITED STATES PATENT AND TRADEMARK OFFICE
CERTIFICATE OF CORRECTION

| | | |
|---|---|---|
| PATENT NO. | : 10,881,582 B2 | Page 1 of 1 |
| APPLICATION NO. | : 16/004858 | |
| DATED | : January 5, 2021 | |
| INVENTOR(S) | : Banerjee et al. | |

It is certified that error appears in the above-identified patent and that said Letters Patent is hereby corrected as shown below:

On the Title Page

Item (72), Line 2, should read:
Kathryn CRAMER, Warren, NJ

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*